Patented Mar. 17, 1953

2,631,937

UNITED STATES PATENT OFFICE 2,631,937

PREPARED FISH BAIT AND METHOD OF MANUFACTURING SAME

Donald R. Buss, Lanark, Ill.

No Drawing. Application June 16, 1949,
Serial No. 99,592

5 Claims. (Cl. 99—3)

This invention relates to a new and improved kind of prepared fish bait and the method of making the same.

Poultry blood, and also to some extent animal blood is used in fisheries for the feeding of newly hatched fingerlings, or baby fish, of all kinds. It is, therefore, evident that if blood could be incorporated satisfactorily in a prepared fish bait, it would attract minnows and other smaller fish, and, since it is well known that the small fish attract the predatory larger fish, the chances of catching them with such a bait would be thereby greatly increased. This is entirely aside, of course, from the fact that blood permeating the water from such a prepared fish bait, getting into the gills of the kinds of large fish the fisherman is after, would excite the taste glands in these fish and thus lure them to the bait. I am aware that some efforts have been made in the direction of incorporating blood in prepared fish baits, but they have not been successful, for one good reason or another. For example, due to the fact that blood spoils quickly if not properly preserved, some bait manufacturers resorted to the use of formaldehyde, and other preservatives, but, obviously, these preservatives ruined the bait entirely and nothing was accomplished by the use of the blood as an ingredient of these baits, preserved blood being utterly unpalatable to small and large fish alike. Then, too, blood goes into solution too readily, and, unless some setting agent or deterrent is employed, the bait gets washed out and substantially useless too quickly to be effective. Furthermore, there is the problem of preventing or deterring disintegration of the bait, and the bait must be tough enough to prevent portions being broken off too readily by fish nibbling thereon. It is, therefore, the principal object of my invention to provide a prepared fish bait avoiding all of the objections mentioned and solving all of these problems, the prepared bait of my invention having the body thereof formed by a sponge-like material, which when dry and compressed takes up very little room in the tackle box, but which when wetted fluffs up to several times its size and is soft yet tough, synthetic cellulose material being particularly well adapted for this purpose and being not only softer than the natural sponge but far less expensive; this sponge-like material in the preparation of the bait being chopped up and saturated in poultry blood preferably, and the saturated material being then dried slowly by circulation of warm air over it (the warm air used being preferably not over 120° F.), so as to produce a highly concentrated dehydrated bait that will stay nicely on a common fish hook when the hook is inserted through a small fragment.

The bait bleeds slowly into the water luring the fish, small and large alike, long distances as a result of the blood tainted water getting into their gills, whereupon they track the streamers of blood back to the source. I have found that when paraffin oil or other waxes are used as a setting agent or deterrent in the proper proportions, I can readily control the time element involved in the dehydrated blood dissolving in the water. At present I prefer to make a mixture of 5% paraffin oil and 95% blood, but that is for a bait primarily designed for catfish, and, of course, if slower bleeding into the water is desired, the amount of paraffin oil should be increased, and vice versa if faster bleeding is desired. Blood is approximately 85% water to begin with, and, hence, when the sponge-like material saturated with the blood is dehydrated, there is a concentration, making the blood in this bait five times more potent than fresh blood, and, what is considered equally important, this prepared bait, despite the blood therein, is dry and nearly odorless in package form, and there is no problem of preservation, because this dehydrated bait will not spoil. The poultry bloods commonly used are from turkeys, ducks, and chickens, and, when animal blood is used, the blood of cows, horses, and hogs is used. The natural color of the cellulose material is yellowish, but I have found that tinting it blood-red with suitable dies makes it best for most game fish. However, the color may be varied as desired.

This bait may be used alone on hooks or as an accompaniment to other baits, and may be used with plugs, flies, spoons, spinners, live and cut bait, making any of these other baits much more effective for catching big fish in fresh or salt water. The blood bleeding into the water is a fast acting taste gland exciter, and lures schools of minnows to the vicinity immediately to aid in catching big fish on this prepared bait, when it is used alone, or on artificial lures or other baits in connection with which it may be used. Hence, this bait is excellent, too, for use in minnow traps. The bait, due to the blood content, is ideal for channel catfish, but will also lure bullheads, trout, sun fish, and other fish that like blood, and that, of course, is true of practically all game fish. To those wishing to make the bait a powerful smelling bait, this bait may have water added to it and be allowed to stand in a warm place a few hours, but it is otherwise nearly odorless in its package form and will last indefinitely, provided it is kept dry. The bait lures by sight and taste in clear or muddy waters, substantially alike. The fisherman should be careful to protect the bait and hooks from dogs, cats, and other animals and pets (which might swallow the hooks), because animals detect the smell of the blood present, and they relish this bait as a food.

It is believed the foregoing description conveys a good understanding of the objects and advantages of my invention. The appended claims have been drawn with a view to covering all legitimate modifications and adaptations.

I claim:

1. A method of manufacturing a fishing bait ready for use without any additions, consisting in thoroughly saturating small pieces of absorbent material with an excess of blood mixed with a suitable water absorption deterring agent, draining any surplus liquid present after the mixture has been allowed to stand for a predetermined period of absorption, and then slowly but thoroughly drying the saturated material.

2. As a new article of manufacture, a dry fishing bait ready for use without any additions, the said bait being formed of a sponge body material substantially uniformly impregnated with blood mixed with a water absorption deterrent and dried onto the fibres thereof, the blood being otherwise in its natural substantially unadulterated form, water absorption deterring agent serving to reduce the rate of solution of the blood in water.

3. As a new article of manufacture, a dry fishing bait ready for use without any additions, the said bait being formed of a sponge body material substantially uniformly impregnated with blood mixed with a waxy substance and dried onto the fibres thereof, the blood being otherwise in its natural substantially unadulterated form, the waxy substance serving to reduce the rate of solution of the blood in water.

4. As a new article of manufacture, a dry fishing bait ready for use without any additions, the said bait being formed of a sponge body material substantially uniformly impregnated with blood mixed with paraffin oil and dried onto the fibres thereof, the blood being otherwise in its natural substantially unadulterated form, paraffin oil serving to reduce the rate of solution of the blood in water.

5. As a new article of manufacture, a dry fishing bait ready for use without any additions, the said bait being formed of a sponge body material substantially uniformly impregnated with blood mixed with paraffin oil and dried onto the fibres thereof, the blood being otherwise in its natural substantially unadulterated form, the paraffin oil serving to reduce the rate of solution of the blood in water, the paraffin oil being in the ratio of about 5% oil to 95% blood, by volume.

DONALD R. BUSS.

REFERENCES CITED

The following references are of record in the file of this patent:

UNITED STATES PATENTS

| Number | Name | Date |
|---|---|---|
| 871,935 | Henzel | Nov. 26, 1907 |
| 1,185,894 | Evans | June 6, 1916 |
| 1,608,688 | Williamson | Nov. 30, 1926 |
| 1,742,956 | Green | Jan. 7, 1930 |

FOREIGN PATENTS

| Number | Country | Date |
|---|---|---|
| 166,893 | Great Britain | of 1922 |